US011390535B2

(12) United States Patent
Chen et al.

(10) Patent No.: US 11,390,535 B2
(45) Date of Patent: Jul. 19, 2022

(54) CO-CURRENT CO-PRECIPITATION METHOD OF CONIO$_2$ THERMISTOR POWDERS

(71) Applicant: Shihezi University, Xinjiang (CN)

(72) Inventors: Long Chen, Xinjiang (CN); Yifan Chen, Xinjiang (CN); Haihai Fu, Xinjiang (CN); Kaiwen Sun, Xinjiang (CN); Yan Zhao, Xinjiang (CN); Haoquan Li, Xinjiang (CN); Changchun Fan, Xinjiang (CN)

(73) Assignee: Shihezi University, Xinjiang (CN)

( * ) Notice: Subject to any disclaimer, the term of this patent is extended or adjusted under 35 U.S.C. 154(b) by 135 days.

(21) Appl. No.: 16/809,938

(22) Filed: Mar. 5, 2020

(65) Prior Publication Data

US 2021/0053840 A1 Feb. 25, 2021

(30) Foreign Application Priority Data

Aug. 19, 2019 (CN) ......................... 201910764236.5

(51) Int. Cl.

| | |
|---|---|
| ***C01G 53/04*** | (2006.01) |
| ***B01D 9/00*** | (2006.01) |
| ***B01J 6/00*** | (2006.01) |
| ***G01K 7/22*** | (2006.01) |

(52) U.S. Cl.

CPC ............ *C01G 53/04* (2013.01); *B01D 9/005* (2013.01); *B01D 9/0045* (2013.01); *B01J 6/004* (2013.01); *G01K 7/22* (2013.01); *C01P 2002/72* (2013.01); *C01P 2004/03* (2013.01); *C01P 2006/32* (2013.01); *C01P 2006/40* (2013.01)

(58) Field of Classification Search

CPC ...... C01G 53/04; B01D 9/0045; B01D 9/005; B01J 6/004; G01K 7/22

See application file for complete search history.

(56) References Cited

U.S. PATENT DOCUMENTS

2002/0107140 A1* 8/2002 Hampden-Smith ...... B01J 19/10 502/185

* cited by examiner

*Primary Examiner* — James A Fiorito

(74) *Attorney, Agent, or Firm* — Collard & Roe, P.C.

(57) ABSTRACT

The disclosure relates to a co-current co-precipitation method of $CoNiO_2$ thermistor powders. The method comprises the steps of mixing, stirring, precipitating, aging, suction filtration, washing and drying firstly using nickel nitrate and cobalt nitrate as raw materials to obtain cobalt hydroxide, and then calcining in a tubular furnace at an inert atmosphere to prepare $CoNiO_2$ nano powders. The method has the advantages of simple operation, low cost, short cycle, high yield and no environmental pollution, and further oxidization of the $CoNiO_2$ nano material into $NiCo_2O_4$ thermistor powders can be effectively avoided through selection and adjustment of calcination process parameters and inert atmosphere. A high-precision, fast-response and small-volume temperature sensor material can be prepared from $CoNiO_2$ thermistor powders obtained by the method of the disclosure.

1 Claim, 1 Drawing Sheet

3.0kV 8.1mm x20.0k SE(M) 2.00um

CO-CURRENT CO-PRECIPITATION METHOD OF $CoNiO_2$ THERMISTOR POWDERS

CROSS REFERENCE TO RELATED APPLICATIONS

Applicant claims priority under 35 U.S.C. § 119 of Chinese Application No. 201910764236.5 filed Aug. 19, 2019, the disclosure of which is incorporated by reference.

TECHNICAL FIELD

The disclosure relates to a co-current co-precipitation method of $CoNiO_2$ thermistor powders, and particularly relates to a preparation method of a semi-conductor nano material.

BACKGROUND

A negative temperature coefficient (NTC) thermistor refers to a material whose resistance value decreases exponentially with the increase of the temperature within the range of working temperature. It, especially, a $CoNiO_2$ NTC thermal-sensitive material with high b value, low resistivity and good thermal stability, plays an important role in the fields of military, aerospace, home appliances, automobiles and the like. With the continuous development of theoretical researches and preparation technologies, all of the electrical property, thermal stability and repeatability of the material have been greatly improved. At present, it is urgent to need NTC thermistors and infrared detectors with higher precision, faster response and better stability in the civil industry and aerospace industry. Therefore, there are increasing requirements for the output and quality of thermistors.

Preparation of powders is the most crucial step for the preparation of a thermistor element. Nano-scale powder has high reaction activity, which obviously improves the consistency of B value and resistance value of the NTC thermistor, and greatly improves the interchangeability of elements. The researches prove that uniform particle size distribution and appropriate granularity directly affect the electrical property, stability and consistency of the NTC thermistor. On the one hand, preparation and synthesis of nano NTC thermistor powders can improve the performance of the existing bulk element, and on the other hand, it has far-reaching significance for the preparation of micro NTC thermistor elements.

At present, the methods involved in the existing technology are either complex in operation and high in experimental requirements, or complex in process, high in equipment requirements, difficult to operate and low in industrial application value. In order to solve the problems existing in the prior art, the disclosure adopts a co-current co-precipitation method to prepare nano $CoNiO_2$ powders.

At the same time, Co ions in the $CoNiO_2$ powders are extremely easily oxidized in the process of calcination, which makes it become a difficult point in the process of powders manufacturing. During the calcination process, we ensure that the obtained nano material is stable in property and not easy to oxidize by introducing inert atmosphere argon for protection and strictly controlling calcination temperature-rising rate and calcination temperature and other process parameters as well as calcination atmosphere.

SUMMARY OF THE INVENTION

The objective of the disclosure is to provide a co-current co-precipitation method of $CoNiO_2$ thermistor powders and prepare the $CoNiO_2$ thermistor powders into a high-precision, fast-response and small-volume temperature sensor material. The method comprises the steps of mixing, stirring, precipitating, aging, suction filtration, washing and drying by firstly using nickel nitrate and cobalt nitrate as raw materials to obtain cobalt hydroxide, and then calcining in a tubular furnace at an inert atmosphere to prepare $CoNiO_2$ nano powders. The method has the advantages of convenient operation, low cost, short period, high yield, no environmental pollution and the like. The $CoNiO_2$ nano material being further oxidized into $NiCo_2O_4$ can be avoided through selection and adjustment of calcination process parameters and inert atmosphere. A high-precision, fast-response and small-volume temperature sensor material can be prepared from $CoNiO_2$ thermistor powders obtained by the method of the disclosure.

The disclosure provides a co-current co-precipitation method of $CoNiO_2$ thermistor powders, comprising the following steps:

a, mixing raw materials $Co(NO_3)_2$ and $Ni(NO_3)_2$ in a mole ratio of 1:1, and dissolving the obtained mixture into deionized water, so as to prepare 0.5-3 mol/L mixed solution A;

b, weighing $Co(NO_3)_2$ and $Ni(NO_3)_2$ in a mole ratio of 1:(1.2-2.0), then weighing sodium hydroxide, oxalic acid, sodium carbonate, ammonium bicarbonate or ammonium hydroxide, and adding deionized water, so as to prepare 0.5-3 mol/L solution B;

c, weighing polyvinylpyrrolidone powders, polyethylene glycol 400, polyethylene glycol 600, cetyltrimethyl ammonium bromide or triton X-100 to be dissolved into deionized water, so as to prepare dispersant solution C having a mass fraction of 0.5-10%;

d, respectively putting the solution A and solution B prepared in step a and step b in a dropping funnel, simultaneously dropwise adding the solution A and the solution B into the solution C in step c at the speed of 0.5-2 drop/s at the same time, and magnetically stirring for 1-4 hours to form a precipitate;

e, standing and aging the precipitate formed in step d for 24-72 h, then carrying out suction filtration, and washing to be neutral; and f, putting the precipitate obtained in step e into a vacuum drying oven for drying, then putting the dried precipitate into a tubular furnace, introducing inert gas argon or nitrogen, raising the temperature of the tubular furnace to 200-250° C. at the heating rate of 0.5-2° C./min, calcining at a constant temperature and preserving for 30-60 min, then heating to 300-600° C., calcining at a constant temperature and preserving for 1-4 h, cooling down to room temperature at the cooling rate of 0.5-2° C./min, calcining, and subsequently and carrying out dry ball milling for 2 h, so as to obtain the $CoNiO_2$ thermistor powders.

The disclosure relates to a co-current co-precipitation method of $CoNiO_2$ thermistor powders, which has been protected by inert gas throughout the calcination process from beginning to end.

The disclosure relates to the co-current co-precipitation method of $CoNiO_2$ thermistor powders. The $CoNiO_2$ powders synthesized by this method undergoes tabletting, sintering and electrode coating to obtain a thermistor chip, an electrode lead is subjected to spot welding, and the thermistor is tested.

The co-current co-precipitation method of $CoNiO_2$ thermistor powders disclosed by the disclosure has the advantages:

1) The $CoNiO_2$ powders whose molar ratio is strictly controllable can be obtained;

2) The synthesis of the $CoNiO_2$ powders using the co-current co-precipitation method has the advantages of simple operation, low cost, high yield, short generation cycle and the like, and this method is easy for industrial production;

3) The further oxidation process from the $CoNiO_2$ nano material into $NiCo_2O_4$ can be effectively avoided through selection and adjustment of calcination process parameters and inert atmosphere.

DESCRIPTION OF THE EMBODIMENTS

Figure 1:
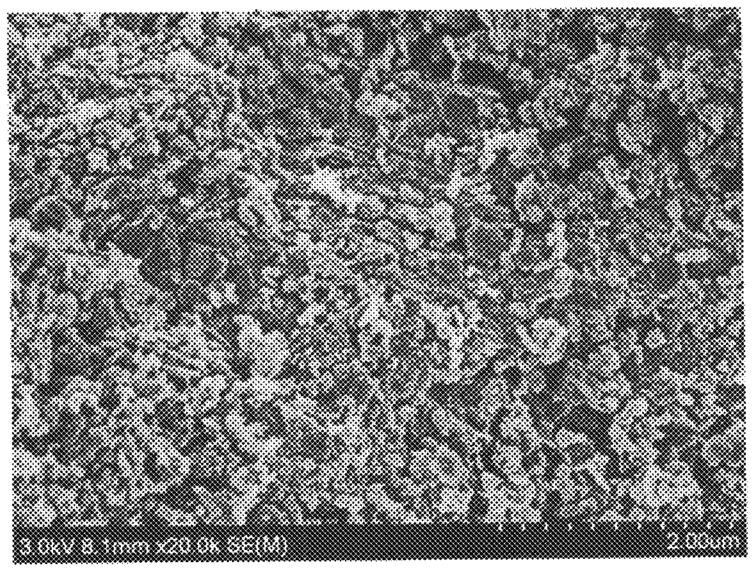
FIG. 1 is an SEM characterization of $CoNiO_2$ powders prepared in example 2 of the disclosure.
Figure 2:
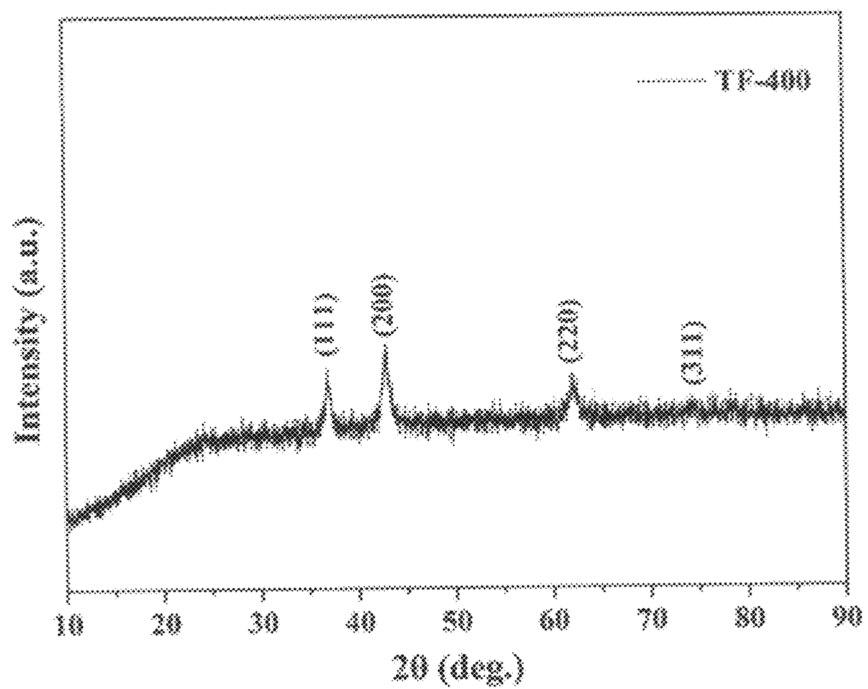
FIG. 2 is an XRD characterization of $CoNiO_2$ powders prepared in example 2 of the disclosure.

Example 1 a, raw materials $Co(NO_3)_2$ and $Ni(NO_3)_2$ were mixed in a mole ratio of 1:1, and dissolved into deionized water, so as to prepare 0.5 mol/L mixed solution A;

b, $Co(NO_3)_2$ and $Ni(NO_3)_2$ were weighed in a mole ratio of 1:1.2, then sodium hydroxide was weighed, and deionized water was added, so as to prepare 0.5 mol/L solution B;

c, polyvinylpyrrolidone powders was weighed as a dispersant and dissolved into deionized water, so as to prepare dispersant solution C having a mass fraction of 0.5%;

d, the solution A and solution B prepared in step a and step b were respectively put in a dropping funnel, simultaneously dropwise added into the solution C in step c at the speed of 0.5 drop/s, and magnetically stirred for 1 hour to form a precipitate;

e, the precipitate formed in step d was stood and aged for 24 h, then subjected to suction filtration, and washed to be neutral; and f, the precipitate obtained in step e was put into a vacuum drying oven for drying, then put into a tubular furnace, inert gas argon or nitrogen was introduced, the temperature of the tubular furnace was raised to 200° C. at the heating rate of 0.5° C./min, calcination was carried out at a constant temperature and preservation was performed for 30 min, then the temperature was raised to 300° C., then calcination was carried out at a constant temperature and preservation was performed for 1 h, the temperature was reduced to room temperature at the cooling rate of 0.5° C./min, calcinination was carried out, and subsequently dry ball milling was carried out for 2 h, so as to obtain the $CoNiO_2$ thermistor powders. The whole calcination process was protected by inert gas from beginning to end.

Example 2 a, raw materials $Co(NO_3)_2$ and $Ni(NO_3)_2$ were mixed in a mole ratio of 1:1, and dissolved into deionized water, so as to prepare 1 mol/L mixed solution A;

b, $Co(NO_3)_2$ and $Ni(NO_3)_2$ were weighed in a mole ratio of 1:1.4, then oxalic acid was weighed, and deionized water was added, so as to prepare 1 mol/L solution B;

c, polyethylene glycol 400 was weighed as a dispersant and dissolved into deionized water, so as to prepare dispersant solution C having a mass fraction of 2%;

d, the solution A and solution B prepared in step a and step b were respectively put in a dropping funnel, simultaneously dropwise added into the solution C in step c at the speed of 1 drop/s, and magnetically stirred for 2 h to form a precipitate;

e, the precipitate formed in step d was stood and aged for 36 h, then subjected to suction filtration, and washed to be neutral; and f, the precipitate obtained in step e was put into a vacuum drying oven for drying, then put into a tubular furnace, inert gas argon or nitrogen was introduced, the temperature of the tubular furnace was raised to 210° C. at the heating rate of 1° C./min, calcination was carried out at a constant temperature and preservation was performed for 40 min, then the temperature was raised to 400° C., then calcination was carried out at a constant temperature and preservation was performed for 2 h, the temperature was reduced to room temperature at the cooling rate of 1° C./min, calcinination was carried out, and subsequently dry ball milling was carried out for 2 h, so as to obtain the $CoNiO_2$ thermistor powders. The whole calcination process was protected by inert gas from beginning to end.

Example 3 a, raw materials $Co(NO_3)_2$ and $Ni(NO_3)_2$ were mixed in a mole ratio of 1:1, and dissolved into deionized water, so as to prepare 1.5 mol/L mixed solution A;

b, $Co(NO_3)_2$ and $Ni(NO_3)_2$ were weighed in a mole ratio of 1:1.6, then sodium carbonate was weighed, and deionized water was added, so as to prepare 1.5 mol/L solution B;

c, polyethylene glycol 600 was weighed as a dispersant and dissolved into deionized water, so as to prepare dispersant solution C having a mass fraction of 4%;

d, the solution A and solution B prepared in step a and step b were respectively put in a dropping funnel, simultaneously dropwise added into the solution C in step c at the speed of 1 drop/s, and magnetically stirred for 2 h to form a precipitate;

e, the precipitate formed in step d was stood and aged for 48 h, then subjected to suction filtration, and washed to be neutral; and f, the precipitate obtained in step e was put into a vacuum drying oven for drying, then put into a tubular furnace, inert gas argon or nitrogen was introduced, the temperature of the tubular furnace was raised to 220° C. at the heating rate of 1° C./min, calcination was carried out at a constant temperature and preservation was performed for 40 min, then the temperature was raised to 400° C., then calcination was carried out at a constant temperature and preservation was performed for 2 h, the temperature was reduced to room temperature at the cooling rate of 1° C./min, calcinination was carried out, and subsequently dry ball milling was carried out for 2 h, so as to obtain the $CoNiO_2$ thermistor powders. The whole calcination process was protected by inert gas from beginning to end.

Example 4 a, raw materials $Co(NO_3)_2$ and $Ni(NO_3)_2$ were mixed in a mole ratio of 1:1, and dissolved into deionized water, so as to prepare 2 mol/L mixed solution A;

b, $Co(NO_3)_2$ and $Ni(NO_3)_2$ were weighed in a mole ratio of 1:1.8, then ammonium bicarbonate was weighed, and deionized water was added, so as to prepare 2 mol/L solution B;

c, cetyltrimethyl ammonium bromide was weighed as a dispersant and dissolved into deionized water, so as to prepare dispersant solution C having a mass fraction of 6.5%;

d, the solution A and solution B prepared in step a and step b were respectively put in a dropping funnel, simultaneously dropwise added into the solution C in step c at the speed of 1.5 drop/s, and magnetically stirred for 3 h to form a precipitate;

e, the precipitate formed in step d was stood and aged for 48 h, then subjected to suction filtration, and washed to be neutral; and f, the precipitate obtained in step e was put into a vacuum drying oven for drying, then put into a tubular furnace, inert gas argon or nitrogen was introduced, the temperature of the tubular furnace was raised to 230° C. at the heating rate of 1.5° C./min, calcination was carried out at a constant temperature and preservation was performed for 50 min, then the temperature was raised to 500° C., then calcination was carried out at a constant temperature and preservation was performed for 3 h, the temperature was reduced to room temperature at the cooling rate of 1.5° C./min, calcinination was carried out, and subsequently dry ball milling was carried out for 2 h, so as to obtain the $CoNiO_2$ thermistor powders. The whole calcination process was protected by inert gas from beginning to end.

Example 5 a, raw materials $Co(NO_3)_2$ and $Ni(NO_3)_2$ were mixed in a mole ratio of 1:1, and dissolved into deionized water, so as to prepare 2.5 mol/L mixed solution A;

b, $Co(NO_3)_2$ and $Ni(NO_3)_2$ were weighed in a mole ratio of 1:1.8, then ammonium hydroxide was weighed, and deionized water was added, so as to prepare 2.5 mol/L solution B;

c, triton X-100 was weighed as a dispersant and dissolved into deionized water, so as to prepare dispersant solution C having a mass fraction of 8.5%;

d, the solution A and solution B prepared in step a and step b were respectively put in a dropping funnel, simultaneously dropwise added into the solution C in step c at the speed of 1.5 drop/s, and magnetically stirred for 3 h to form a precipitate;

e, the precipitate formed in step d was stood and aged for 60 h, then subjected to filtered at reduced pressure, and washed to be neutral; and f, the precipitate obtained in step e was put into a vacuum drying oven for drying, then put into a tubular furnace, inert gas argon or nitrogen was introduced, the temperature of the tubular furnace was raised to 240° C. at the heating rate of 1.5° C./min, calcination was carried out at a constant temperature and preservation was performed for 50 min, then the temperature was raised to 500° C., then calcination was carried out at a constant temperature and preservation was carried out for 3 h, the temperature was reduced to room temperature at the cooling rate of 1.5° C./min, calcinination was carried out, and subsequently dry ball milling was carried out for 2 h, so as to obtain the $CoNiO_2$ thermistor powders. The whole calcination process was protected by inert gas from beginning to end.

Example 6 a, raw materials $Co(NO_3)_2$ and $Ni(NO_3)_2$ were mixed in a mole ratio of 1:1, and dissolved into deionized water, so as to prepare 3 mol/L mixed solution A;

b, $Co(NO_3)_2$ and $Ni(NO_3)_2$ were weighed in a mole ratio of 1:2.0, then sodium hydroxide was weighed, and deionized water was added, so as to prepare 3 mol/L solution B;

c, polyvinylpyrrolidone powders was weighed as a dispersant and dissolved into deionized water, so as to prepare dispersant solution C having a mass fraction of 10%;

d, the solution A and solution B prepared in step a and step b were respectively put in a dropping funnel, simultaneously dropwise added into the solution C in step c at the speed of 2 drop/s, and magnetically stirred for 4 h to form a precipitate;

e, the precipitate formed in step d was stood and aged for 72 h, then filtered at reduced pressure, and washed to be neutral; and f, the precipitate obtained in step e was put into a vacuum drying oven for drying, then put into a tubular furnace, inert gas argon or nitrogen was introduced, the temperature of the tubular furnace was raised to 250° C. at the heating rate of 2° C./min, calcination was carried out at a constant temperature and preservation was performed for 60 min, then the temperature was raised to 600° C., then calcination was carried out at a constant temperature and preservation was performed for 4 h, the temperature was reduced to room temperature at the cooling rate of 2° C./min, calcinination was carried out, and subsequently dry ball milling was carried out for 2 h, so as to obtain the $CoNiO_2$ thermistor powders. The whole calcination process was protected by inert gas from beginning to end.

Example 7

The $CoNiO_2$ thermistor powders obtained in any one of examples 1-6 were subjected to X-ray diffraction and scanning electron microscope analysis characterization. The test showed that the $CoNiO_2$ thermistor powders obtained by the method of the disclosure all formed the $CoNiO_2$ cubic crystal phase whose morphology was basically hexahedral nano sheets.

What is claimed is:

1. A co-current co-precipitation method of $CoNiO_2$ thermistor powders, comprising the following steps:

a, mixing raw materials $Co(NO_3)_2$ and $Ni(NO_3)_2$ in a mole ratio of 1:1, and dissolving the obtained mixture into deionized water, so as to prepare a 0.5-3 mol/L mixed solution A;

b, weighing $Co(NO_3)_2$ and $Ni(NO_3)_2$ in a mole ratio of 1:(1.2-2.0), then weighing sodium hydroxide, oxalic acid, sodium carbonate, ammonium bicarbonate or ammonium hydroxide, and adding deionized water to the weighed $Co(NO_3)_2$ and $Ni(NO_3)_2$ in the mole ratio of 1:(1.2-2.0) and the weighed sodium hydroxide, oxalic acid, sodium carbonate, ammonium bicarbonate or ammonium hydroxide, so as to prepare a 0.5-3 mol/L solution B;

c, weighing polyvinylpyrrolidone, polyethylene glycol 400, polyethylene glycol 600, cetyltrimethyl ammonium bromide or triton X-100, and dissolving the weighed polyvinylpyrrolidone, polyethylene glycol 400, polyethylene glycol 600, cetyltrimethyl ammonium bromide or triton X-100 into deionized water, so as to prepare a dispersant solution C having a mass fraction of 0.5-10%;

d, respectively putting the solution A and the solution B prepared in step a and step b in a dropping funnel, simultaneously dropwise adding the solution A and the solution B into the solution C in step c at a speed of 0.5-2 drop/s, and magnetically stirring the solution C after dropwise adding the solution A and the solution B for 1-4 hours to form a precipitate;

e, standing and aging the precipitate formed in step d for 24-72 hours, subsequently carrying out suction filtration of the precipitate, and washing of the precipitate to have a neutral pH; and f, putting the precipitate obtained in step e into a vacuum drying oven for drying, then putting the dried precipitate into a tubular furnace, introducing inert gas argon or nitrogen to form an inert atmosphere, raising the temperature of the tubular furnace to 200-250° C. at a heating rate of 0.5-2° C./min, calcining the dried precipitate in the tubular furnace under the inert atmosphere at a constant temperature and preserving for 30-60 min, then heating to 300-600° C., then calcining the heated preserved calcined dried precipitate at a constant temperature and preserving for 1-4 hours, cooling to room temperature at a cooling rate of 0.5-2° C./min, calcining the cooled preserved precipitate, and subsequently carrying out dry ball milling for 2 hours, so as to obtain the $CoNiO_2$ thermistor powders.

* * * * *